United States Patent [19]

Levine et al.

[11] Patent Number: 4,984,290
[45] Date of Patent: Jan. 8, 1991

[54] METHOD OF CONTROLLING COMMUNICATIONS IN A CELLULAR RADIOTELEPHONE SYSTEM

[75] Inventors: Stephen N. Levine, Itasca; Larry Puhl, Sleepy Hollow, both of Ill.

[73] Assignee: Motorola, Inc., Schaumburg, Ill.

[21] Appl. No.: 228,071

[22] Filed: Aug. 4, 1988

[51] Int. Cl.$^5$ .............................................. H04Q 7/00
[52] U.S. Cl. ........................................ 455/33; 455/54; 379/60; 379/63; 370/110.1
[58] Field of Search ................. 370/76, 110.1; 379/59, 379/60, 63; 455/33, 34, 38, 54, 56; 375/114–116

[56] References Cited

U.S. PATENT DOCUMENTS

| | | | |
|---|---|---|---|
| 4,635,285 | 1/1987 | Coombes | 455/33 |
| 4,654,867 | 3/1987 | Labedz et al. | 379/59 |
| 4,697,260 | 9/1987 | Gravel et al. | 379/59 |
| 4,803,703 | 2/1989 | DeLuca et al. | 375/116 |
| 4,803,726 | 2/1989 | Levine et al. | 370/110.1 |
| 4,811,380 | 3/1989 | Spear | 379/63 |
| 4,813,040 | 3/1989 | Futato | 370/110.1 |

OTHER PUBLICATIONS

"High Capacity Land Mobile Communications Systems", NIT International Symposium, Jul. 13, 1983, Tokyo.
A Schematic Diagram of "In-Service Control Data Transmission System" (FIG. 2).
"High Capacity Automobile Telephone System", Japan Telecommunications Review, Jan. 1979.
"Digital Cellular Release", by Steve Levine, Larry Puhl and Tom Hull, Motorola Technical Developments, vol. 7, Oct. 1987, pp. 35 and 36.

Primary Examiner—Reinhard J. Eisenzopf
Assistant Examiner—Andrew Faile
Attorney, Agent, or Firm—F. John Motsinger

[57] ABSTRACT

A cellular system employs a subaudible signalling control protocol. The protocol includes transmitting supervisory related signals between the radiotelephone and one of the cell sites at a first subaudible digital bit rate, and transmitting data messages between the radiotelephone and said one of the cell sites at a second subaudible digital bit rate. Additionally, the system employs specific protocols involving alert, hand-off and call disconnect which accommodate the subaudible signalling, yet provide significant integrity and reliability advantages over previously known protocols.

13 Claims, 1 Drawing Sheet

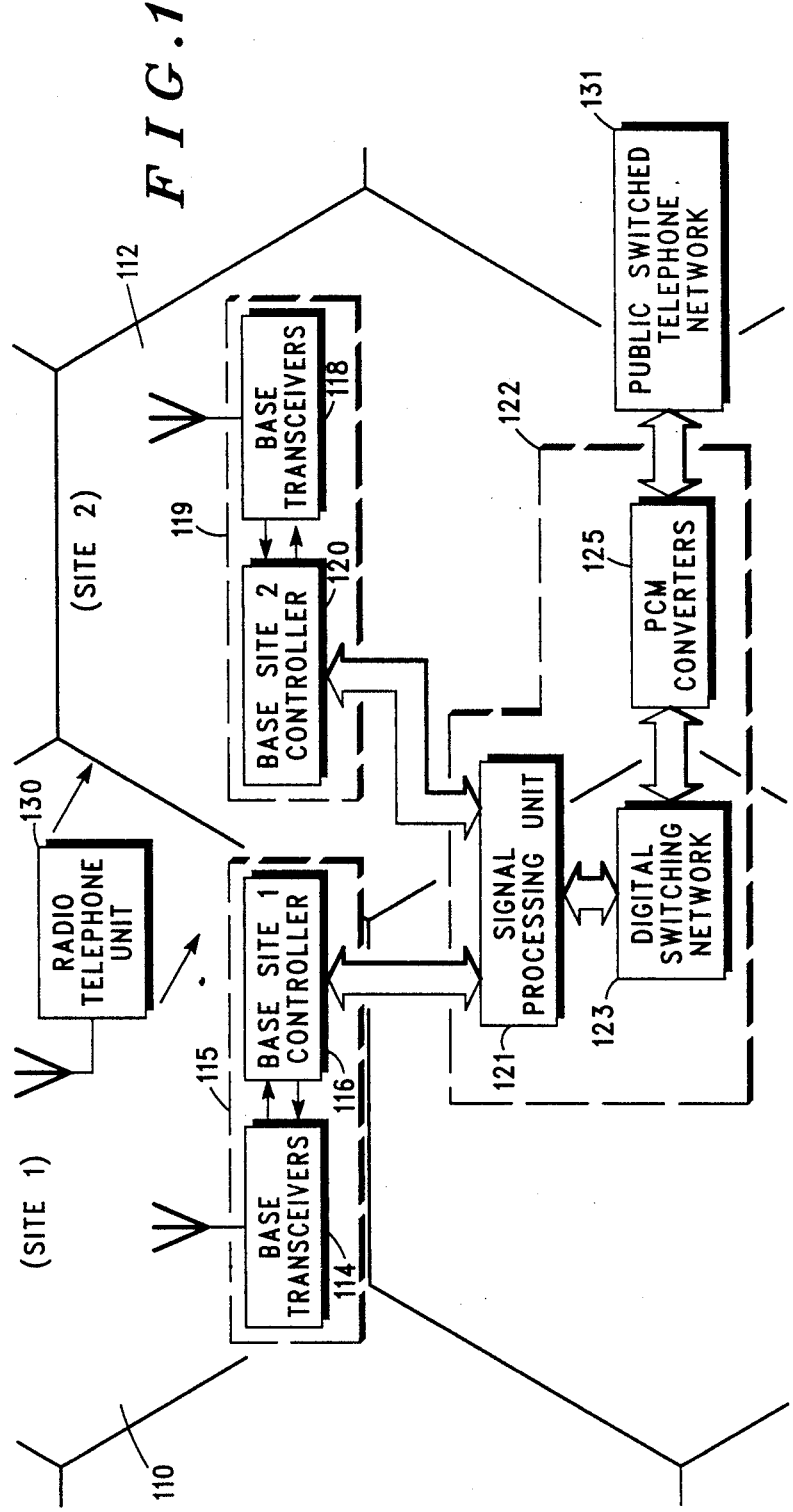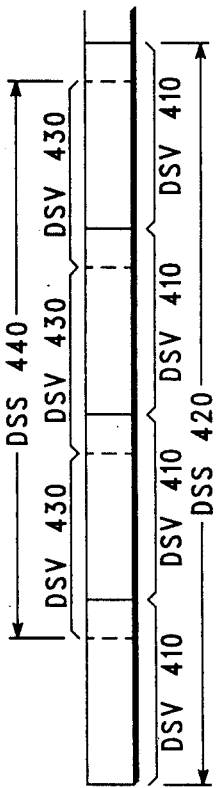

METHOD OF CONTROLLING COMMUNICATIONS IN A CELLULAR RADIOTELEPHONE SYSTEM

FIELD OF THE INVENTION

The present invention relates generally to cellular radio-frequency (RF) communication systems, and, more particularly, to signalling protocols in such systems.

DESCRIPTION OF THE PRIOR ART

Conventional cellular-type radiotelephone RF communications systems employ signalling protocols which tend to interfere with system communication. Typically such cellular systems implement their signalling protocol using supervisory audio tone (SAT), signalling tone (ST) and 10K bit per second (BPS) bursted Manchester data messages. SAT, ST and bursted Manchester data messages are used for executing such system protocols as radiotelephone alerts, radiotelephone call releases, handoffs, flashes for bursts of digital communication and power level change messages.

An example of the use of SAT involves the desirability to distinguish cellular communication in one cell from such communication in an adjacent cell. SAT, represented by a predetermined set of tones, is modulated onto the voice channel by both the cell site and the subscriber unit (radiotelephone). If either the cell site or the subscriber unit detects the presence of an incorrect SAT, the voice path is interrupted because that is an indication that the transceiver has been seized by a cochannel signal. If this seizure lasts longer than a predetermined time interval, the call will be terminated.

An example of the use of ST involves an alert from the subscriber unit to the cell site. When a call to the subscriber occurs, a command is sent from the cell site instructing the subscriber unit to activate its audible ring function. The subscriber unit responds to this command by transmitting ST to the cell site until an off-hook condition is detected.

There are a number of such protocols employing SAT and/or ST. It will suffice to mention that both SAT and ST are typically implemented using a predetermined set of tones just above the high end of the voice frequency band. E.g., in many systems SAT is transmitted at 5970 Hz., 6000 Hz., and 6030 Hz., while ST is transmitted at 10K Hz.

Unfortunately, this conventional signalling protocol is the cause of interference if the channel bandwidth is significantly reduced for improved spectral efficiency. For example, the harmonics of the SAT and ST tones cause significant adjacent channel interference. Also, due to the wide spectral property of Manchester data, voice must be muted while data messages are transmitted in such systems.

Additionally, these tones can cause a number of system problems due to their susceptibility to false. Because these tones are used for executing such system protocols as alerts, handoffs and the like, amongst other problems, the falsing of these tones has been known to disconnect radiotelephone handoff candidates and inadvertantly initiate releases of radiotelephone calls.

For these reasons, a signalling protocol for a cellular communication system is needed which overcomes the foregoing deficiencies.

OBJECTS OF THE INVENTION

It is an object of the present invention to provide a signalling protocol for a cellular communication system which overcomes the above-mentioned shortcomings, and, more specifically, which provides a subaudible signalling protocol for such a system in a non-interferring manner.

Additional objects of the present invention include providing subaudible alert, hand-off and disconnect signalling protocols which overcome the above mentioned defiencies.

BRIEF DESCRIPTION OF THE DRAWINGS

FIG. 1 is a diagram of a cellular communication system including two cell sites and their respective equipment, according to the present invention.

FIG. 2 is a diagram illustrating one aspect of the signalling protocol, according to the present invention.

DETAILED DESCRIPTION OF THE PREFERRED EMBODIMENT

The arrangement disclosed in this specification is directed to signalling control in a radio frequency (RF) cellular radiotelephone communication systems, and, more particularly, to novel signalling control implementation for a cellular radiotelephone communication systems.

FIG. 1 illustrates such a cellular system. The system in FIG. 1 includes cell site equipment 115 and 119 for two geographic radio frequency (RF) coverage areas (cells) 110 and 112, respectively. For cell 110, the cell site equipment 115 includes a set of base transceivers 114 and a base site (1) controller 116. For cell 112, the cell site equipment 119 includes a set of base transceivers 118 and a base site (2) controller 120 with substantially identical circuitry as the cell site equipment 115.

Overall control of the cell site equipment 115 and 119 is provided by a signal processing unit 121 of a cellular switch controller 122. The switch controller 122 also includes a digital switching network 123 for controlling the call switching operation between a public switched telephone network (PSTN) 131 and the cell site equipment 115 and 119. A set of pulse code modulation (PCM) converters 125 are included in the cellular switch controller 122 for interfacing the system to the PSTN system, reference may be made to "Cellular Voice and Data Radiotelephone System", Labedz et. al., U.S. Pat. No. 4,654,867. For further details of a conventional cellular switch controller, reference may be made to U.S. Pat. No. 4,268,722, Little et al. Both of the above U.S. patents are assigned to the same assignee and incorporated herein by reference.

According to the present invention, such a system is modified according to the following voice channel signalling methodology utilizing sub-audible data transmission. The signalling system preferably utilizes a combination of 100 BPS Manchester data and 200 BPS restricted NRZ data transmission. The subaudible signalling is transmitted continuously along with the speech, thereby not requiring audio muting for transmitting data message bursts as is currently required in previously known systems. In addition, by implementing the SAT and ST signalling functions digitally in a subaudible protocol, according to the present invention, the need for such signalling tones above the high end of the voice frequency band is eliminated, and the spectral efficiency of the system is improved.

Before a detailed discussion of the inventive system is presented, the following definitions set out necessary background language.

Digital Supervisory Vector (DSV): a fixed length digital word, including any cyclic shift of any fixed length digital word; and Digital Supervisory Sequence (DSS): a plurality of continuous DSVs.

In FIG. 2, there is an example of the above defined DSV and DSS. FIG. 2 illustrates a plurality of continuous DSVs 410 comprising a single DSS 420. Additionally, an alternate cyclic shift of the DSVs 410 is shown as DSVs 430, wherein the DSVs 430 comprise a DSS 440 which is the same as DSS 420.

Cross Distance: the Hamming distance from any one DSV or a cyclic shift thereof to a different DSV or a cyclic shift thereof; and Auto Distance: the Hamming distance between a DSV pattern and any cyclic shift thereof.

The description of the present invention will be outlined in three parts, covering:

1. DSV preferred properties;
2. Data message format; and
3. Cellular system protocols utilizing the above formats in subaudible form.

1. DSV Preferred Properties:

DSS preferably consists of the continuous transmission of one of seven DSV patterns or their logical inverses (each DSV and its logical inverse (e.g., 1's complement) corresponds to the identity of one cell site) having the following nine properties:

Property 1: A DSV consists of 24 NRZ bits transmitted at 200 BPS (bits per send). The DSV is transmitted at 200 BPS to provide a maximum number of uncorrelated samples to the receiver for better noise immunity. Although a number of restrictions are necessary as discussed below, this transmission scheme is extremely efficient and effective. It is worth noting that one could also use a 100 BPS data stream and then Manchester modulate to provide the 200 "BPS" data with the necessary low frequency spectrum restrictions. However, transmitting at 200 BPS NRZ is preferred. With some restrictions this scheme allows many non-Manchester patterns to be used, which provides a substantial increase in information transfer. That is, a greater number of DSVs are allowed from which to select, which translates into a DSV set with greater auto and cross distances.

Property 2: All cyclic shifts of each DSV can be detected. This allows the receiver to start detection of DSS during any phase of a DSV starting at any point of a DSS, thereby improving both DSS acquisition time and receive sensitivity. Thus, a unique and distinct DSV can be detected after any 24 bits the DSS are received without ever having to wait for a particular phase (cyclic shift) of a DSV to begin. This imposes a preferred restriction that there be a minimum "auto distance" between all cyclic shifts of a DSV. In a preferred embodiment, the current criteria for 24 sample sequences is a minimum auto distance of 6. The DSS does not need to be thought of as a series DSV words, but as a continuous bit sequence which can be operated on over any length of bits.

Property 3: There must also be a minimum cross distance between all DSVs employed, and between the following data messages: ACK (acknowledgement), NAK (non-acknowledgement), and word synchronization (sync) patterns used in data message transfer, subsequently discussed. In the above referenced preferred embodiment, the criteria for a 24 bit DSV is a minimum cross distance of 6.

Inverted DSVs are used to signal only on the reverse voice channel (RVC), i.e., communications from the radiotelephone to the cell site. Thus, the detection of the inverted DSV is not required in the radiotelephone.

Property 4: All cyclic shifts of each DSV and its inverse preferably have a minimum Hamming distance from all 100 BPS random Manchester data words sampled at 200 samples per second. This distance is hereinafter referred to as the minimum random Manchester distance. This distance is preferably maintained for either phase of the Manchester data. This criteria greatly improves the falsing protection against the Manchester data messages of a co-channel interferer. Without this requirement, data message falsing would be more prevalent, because the falsing protection is based upon the number of bits of the interfering Manchester data word (12) instead of the number of uncorrelated samples (24). This criteria therefore allows for the use of shorter DSVs, with much improved data falsing protection.

Property 5: The DSV should not have more than two consecutive ones or zeroes in order to minimize low frequency content.

Property 6: An integration of a DSV starting from bit 1 to bit 24 (cumulative DC bias) should have an absolute value of 3 or less.

Property 7: Each DSV should have a zero DC bias over the entire pattern.

Property 8: In certain exceptional instances, the auto distance can go to zero before the 24 cyclic shifts.

Property 9: The number of transitions should be maximized for improved PLL (phase locked loop) performance for the radiotelephone circuits and the base site equipment.

A set of 14 DSV patterns (including their respective inverses) plus a compatible word sync correlation pattern have been identified, according to the present invention.

DSSs should be detected independent of sequence phase for minimum acquisition time. That is, all phases of the DSV should be detectable. In addition to decreasing DSS acquisition time, detect sensitivity is improved.

2. Data Message Formats:

A forward voice channel (FVC) message consists of a conventional (40,28) BCH coded Manchester modulated data word at 100 BPS. The forward voice channel (FVC) message (base to radiotelephone) preferably is transmitted after a single transmission of a 30 bit word sync pattern (preferably a non-Manchester 200 BPS pattern with both good auto-correlation and a maximized Hamming distance from DSV patterns).

The SYNC-DSAT cross distance is the Hamming distance between a sync word and a DSS over the length of the sync word. The sync word is chosen to have a maximum and a minimum SYNC-DSAT cross distance from all DSVs or their inverses composing a DSS. For the chosen sync word and DSAT set combination, the SYNC-DSAT cross distance has a maximum value of 20 and a minimum value of 10. The maximum distance criteria is necessary for use of the inverse sync word.

Instead of multiple repeats, as used in some typical cellular systems, an automatic repeat request procedure (ARQ) is implemented for fading protection. At 100 BPS, multiple repeats would take excessive amounts of time. A single word transmission with ARQ takes advantage of the better BER (Bit Error Rate) performance at 100 BPS, while minimizing the time for the transmission of most data messages.

A generic description of the ARQ algorithm illustrated by a FVC message is as follows:

1. The cell-site halts DSS transmission and transmits a single FVC message to the radiotelephone. The cell-site keeps track of the phase of DSS during the FVC message transmission and starts transmitting DSS at the correct relative phase after the message is sent (the correct DSS phase is the same phase that would have been used if there was no FVC message sent).
2. After the cell-site transmits the FVC message, it starts a timeout counter. If a non-acknowledgement (NAK) message is received before timeout, the the FVC message is retransmitted. If an acknowledge message is received before timeout, then no further action is taken. If neither an ACK nor NAK is received before the timeout, then the FVC message is retransmitted.
3. After the radiotelephone receives the FVC message, it checks for bit errors and if any uncorrectable errors are found, a NAK message is transmitted to the cell-site and the radiotelephone waits for another FVC message. The radiotelephone does not need to repeat the NAK message due to the cell-site timeout. If no uncorrectable errors are found, then the FVC message is accepted and an ACK is transmitted to the cell-site. If this ACK message is missed, the cell-site will timeout and retransmit the original FVC message. The radiotelephone, having just received and complied with this message, should disregard the repeat.

NAK: The non-acknowledgment (NAK) message is a single 30 bit inverted Sync Word transmitted at 200 BPS. The NAK message is: 2594CD5A.

The inverted Sync Word can be used because the Sync Word criteria has a maximum as well as a minimum distance of 10 from all cyclic shifts of the DSV set. This allows both Sync Word and inverted Sync Word to be at least 10 bit distance from both the DSV set and the inverted DSV set. This short NAK message minimizes the time needed to turn around and retransmit the original message that was lost.

ACK: The acknowledgement (ACK) message is a Sync Word followed by a FVC message indicating acknowledgement for cell-site to radiotelephone ACKs and a Sync Word followed by a RVC message indicating acknowledgement for a radiotelephone to cell-site ACKs. The full message length is used because (a) ACK messages are not as time critical as NAK because the message has successfully been transmitted and received at this point, and (b) the ACK message can contain information such as the code word for the RADIOTELEPHONE DISCONNECT, and (c) this ACK message can reuse call recovery software.

The sub-audible signalling system utilizes a continuous data channel on each voice channel, versus typical multiplexed high speed data hardware. This provides for a much reduced queueing delay for FVC data messages in the cell site.

Reverse voice channel (RVC), i.e., radiotelephone communication to cell site) messages are handled in a similar way, except that the data messages utilize a (48,36) BCH code.

Digital data messages can interrupt the DSS at any time. The receiver acquires DSS at the end of the data message, having kept track of the correct sequence phase.

3. Cellular System Protocols:

The following protocols have been conventionally implemented in cellular systems. As previously discussed, the known implementations of these protocols have been known to cause releases of calls, false handoffs and have hampered implementation of more spectrally efficient systems. By employing the foregoing DSV properties and data message format, the following protocols, in accordance with the present invention, overcome these deficiencies.

Alert:

After the radiotelephone receives a valid PAGE message and is assigned to a voice channel, the following sequence of events define the ALERT PROTOCOL.

The cell site transmits DSS.

The radiotelephone then detects DSS and identifies (validates) the cell identification over the voice channel.

The radiotelephone transmits DSS to the cell site.

After the cell site has detected and validated DSS from the radiotelephone, it starts continuously transmitting FVC ALERT messages. No ARQ, ACK or NAK is required from radiotelephone before repeating the ALERT message. No interleaving DSAT between ALERT messages is required. The cell site starts to check if DSS has been inverted.

After receiving a valid FVC ALERT message, the radiotelephone rings the radiotelephone user and starts transmitting inverted DSS to the cell site indicating that the radiotelephone is being alerted.

After the cell site detects inverted DSS, it stops transmitting the FVC ALERT message, and the cell site transmits DSS.

When the radiotelephone user goes off-hook, the radiotelephone transmits non-inverted DSS.

When the cell site detects non-inverted DSS, then the cell site connects the call.

Power Change:

The cell-site transmits an FVC message indicating power change. The radiotelephone error detects the message, and if correct, returns an ACK confirming that the power change message arrived error free. It is therefore not necessary to send an order confirmation message with the new power setting, as is typically done in cellular system. If the message has uncorrectable errors, a NAK is returned. The cell-site retransmits the message upon reception of a NAK, or after a timeout without confirmation.

Hand-Off:

A handoff is controlled in the following manner:

The originating cell site requests a handoff and the digital switching network (123 of FIG. 1) identifies target cell.

A conventional three way conference is set-up between the radiotelephone and the target and host cell sites.

The target cell site transmits DSS.

The originating cell site halts DSS while transmitting an FVC hand-off message.

The radiotelephone responds with an ACK message and changes voice frequencies, using the previously discussed ARQ procedure.

The radiotelephone detects and validates DSS from the target cell site.

The radiotelephone transmits inverted DSS to the new host (target) cell site at this time, which identifies that a handoff has just taken place.

The target cell site checks only for inverted DSS to protect against a false from an interfering co-channel transmitter on an adjacent cell site. If the radiotelephone does not confirm within a timeout period, then the target cell call is dropped, and the originating cell call is kept. This prevents a co-channel interferer with non-inverted DSS from falsing the handoff.

The new host cell site checks for and validates the inverted DSS.

The new host cell site transmits, preferably continuously, ACK messages to confirm the reception of the confirmation pattern (inverted DSS from the radiotelephone) and the originating cell call is dropped.

The radiotelephone receives an ACK message and transmits the non-inverted DSS sequence of the target cell site.

The new host cell site detects the radiotelephone's non-inverted DSS, stops transmitting the ACK messages and transmits DSS.

Flash:

The radiotelephone transmits two RVC messages to the cell site containing the called-address information. The cell site acknowledges each message using the ARQ procedure. If the radiotelephone receives a NAK or times out without receiving an ACK, then the RVC message is retransmitted.

Disconnect (Radiotelephone):

In previously known cellular systems, the manner in which a call is disconnected by a radiotelephone is problematic.

In known systems, the release protocol has the radiotelephone transmitting 1.8 seconds of "signalling tone" (10K Hz. tone) to the cell-site to initiate a release. The radiotelephone then unkeys its transmitter, and upon reception of the 1.8 second signalling tone, the cell-site drops the call. This release method experiences a problem. The cell-site can false on an interfering channel's signalling ton and inappropriately drop a call.

This problem is overcome, in accordance with the present invention, by the following protocol.

A radiotelephone transmitted RVC disconnect message is sent to the cell site. The cell site sends to the radiotelephone an FVC Query message containing a cell site code word that is unique to that cell site. If the radiotelephone does not receive the query message within a time out period, the RVC DISCONNECT message is retransmitted. If the radiotelephone receives a Query message, then the radiotelephone returns an ACK message containing this code word. If the cell site instead receives a NAK message, an RVC message with detected errors, or does not receive any message within a timeout interval, then the FVC Query message is retransmitted. If the cell site receives a confirmation ACK message without detected errors but an incorrect code word, then the call is not disconnected. If the cell site receives a confirmation ACK message without uncorrectable errors and the same code word, then the call is disconnected. After the radiotelephone transmits the confirmation ACK message, it waits for a timeout period and drops the call if another Query message is not received.

Disconnect (Landline):

For a voice channel disconnect message initiated from the cell site, an FVC disconnect message is "continuously" sent to the radiotelephone. The call is disconnected if an ACK message is returned by the radiotelephone, or if DSS is dropped for a predetermined time period.

4. Theoretical DSS Channel Performance

The DSV set shown below consists of seven 24 bit DSV patterns (vectors 1–7) plus their inverses (vectors 8–14) in hexidecimal form. The minimum auto distance for all cyclic shifts is 6, and the minimum cross distance for all cyclic shifts is 6. The minimum random Manchester distance is 2 over 25 consecutive bits of the DSS.

DSV Pattern Set:
vect (1)=255a9b
vect (2)=256a6b
vect (3)=25956d
vect (4)=25a9ab
vect (5)=269aab
vect (6)=269ad5
vect (7)=26a6b5
vect (8)=daa564
vect (9)=da9594
vect (10)=da6A92
vect (11)=da5654
vect (12)=d96554
vect (13)=d9652a
vect (14)=d9594a A preferred 30 bit sync word, consistent with the foregoing discussion, is as follows:
1A6B32A5.

False Cross Detect:

This discussion illustrates an exemplary calculation of the probability of detecting an interferer DSS composed of the DSV vector 4 while expecting a DSS composed of the DSV vector 7. This probability is referred to as the cross falsing probability. The vectors used for this calculation represent the worst case cross falsing DSV combination, given the DSV vector set illustrated above.

The cross detect false probability, P(FC), calculation determines the probability of these error patters, given that the relative phases of the DSSs are random.

$$P(FC) = \sum_{i=1}^{24} (Ai)p^i(1-p)^{n-i}$$

p = BER at 200 BPS (Random)
n = number of bits per sequence
Ai = number of error patterns of i bit errors
This becomes:

$$P(FC) = 4p^6(1-p)^{18} + p^8(1-p)^{16} + 4p^{10}(1-p)^{14} + 4p^{12}(1-p)^{12} + 5p^{14}(1-p)^{10} + 5p^{16}(1-p)^8 + p^{18}(1-p)^6$$

For p 0.01

$$P(FC) = 3.338 \times 10^{-12}$$

per received vector.

The above summation becomes the probability of a false cross detect, (given the cyclic reception of the interferer pattern), and sums up all possible error patterns which would cause a false over a 24 bit interval. If the interferer DSS is continuously received, the time interval between falses is as follows:
p=0.01; 1 false/1.14K years
p=0.02; 1 false/21.4 years Manchester Data Message Falses:

It is also possible to false on a co-channel interferer's data messages. The data word falsing estimate is as follows:

Given that a call lasts 100 seconds and contains 5 messages in each direct due to alert, handoffs, power changes etc.; this gives an average of 1.5% of the call time spent transferring data. Uncorrelated samples provide no extra falsing protection against interfering Manchester data patterns. Random data falsing protection, therefore, would be relatively weak. Property no. 4, which requires a minimum distance from all random Manchester data words, greatly improves the data message falsing protection.

Given that the interference is continuous, and that a worst case DSS is received having a random Manchester minimum distance of 2 over 25 bits of DSS, then the probability of falsing on an interferer's data message, P(FD), is equal to:

$$P(FD) = 25 \cdot 2^{-13} P^2 (1-P)^{23}$$

per Manchester bit
where P=BER at 200 BPS=0.01.
Checking for every DSS phase:
P(FD)=2.42×10$^{-7}$ per Manchester bit received This results in a false rate of (detecting both DSAT and DSAT);

Continuous Data: 11.47 hrs/false
1.5% Data Content: 765 hrs/false
False Auto Detect:

When initially detecting DSS, the receiver checks for every possible phase of the DSS. This check is made for every incoming bit (i.e., 200 checks per second). This allows for a 120 msec. detect time, given a 24 bit DSV pattern. To properly detect the correct phase of the DSS, all cyclic shifts of the DSV composing the DSS preferably have a minimum distance from each other. For this DSV set, the auto distance is 6.

The auto detect falsing rate probability, P(FA), calculation is similar to the cross detect falsing probability with the result:

$$P(FA) = 2p^6(1-p)^{18} + p^8(1-p)^{16} + $$
$$4p^{10}(1-p)^{14} + 8p^{12}(1-p)^{12} + $$
$$2p^{14}(1-p)^{10} + 2p^{16}(1-p)^8 + $$
$$4p^{18}(1-p)^6.$$

With p=0.01

$$P(FA) = 1.669 \times 10^{-12}$$

per received vector.

Accordingly, the foregoing calculations derived using the DSV properties set out above clearly illustrate the robustness, reliability and applicability of the present invention for a spectrally efficient cellular communication system.

We claim:

1. A method of controlling communicating between a radiotelephone and one of a plurality of cell sites in a cellular-type radiotelephone communication system, comprising the steps of:

providing a plurality of digital signals identifiable with a uniquely identified cell;

transmitting the digital signals between the radiotelephone and the uniquely identified cell at a first subaudible bit rate; and transmitting data messages between the radiotelephone and the uniquely identified cell at a second subaudible digital bit rate.

2. A method of controlling communications between a radiotelephone and one of a plurality of cello sites in a cellular-type radiotelephone communication system comprising the steps of:

providing a plurality of digital supervisory vectors, each vector representing identification of a unique cell site;

transmitting said vectors between the radiotelephone and one of the cell sites at a first subaudible digital bit rate; and transmitting data messages between the radiotelephone and said one of the cell sites at a second subaudible digital bit rate.

3. The method according to claim 2, wherein the digital supervisory vectors are each of a predetermined bit length, wherein any cyclic shift of one of said vectors is at least a minimum Hamming distance from any other vector and cyclic shifts thereof.

4. The method according to claim 2, wherein the step of transmitting digital supervisory vectors is preceded by the step of providing a minimum Hamming distance between all cyclic shifts of a digital supervisory vector.

5. The method according to claim 2, wherein the step of transmitting digital supervisory sequences is preceded by the step of providing a minimum Hamming distance between any two of the following:

all signal supervisory vector, all cyclic shift of a supervisory vector all logical inverses of all digital supervisory vectors, and all cyclic shifts thereof.

6. The method according to claim 2, wherein the data messages are transmitted in Manchester coded words and wherein the step of transmitting digital supervisory vectors is preceded by the step of providing a minimum distance from any cyclic shift of each digital supervisory vector and its inverse to any Manchester coded word.

7. The method, according to claim 2, wherein the plurality of digital supervisory vectors are composed of a repetition of a single digital supervisory vector or cyclic shift thereof, wherein each vector and any cyclic shift thereof represents identification of a unique cell site.

8. A method of controlling communications between a radiotelephone and one of a plurality of cell sites in a cellular-type radiotelephone communication system, comprising the steps of:

providing a plurality of digital supervisory vectors, each vector and any cyclic shift thereof representing identification of a unique cell site, wherein each sequence is of a predetermined bit length and is of a minimum cross distance from any other vector;

providing a minimum auto distance for all digital supervisory vectors;

providing a minimum Hamming distance between all cyclic shifts of any digital supervisory vector and any inverse thereof;

transmitting said vectors between the radiotelephone and one of the cell sites at a first subaudible digital bit rate for distinguishing between cell sites; and transmitting data messages between the radiotelephone and said one of the cell sites at a second subaudible digital bit rate.

9. A method for controlling communications between a radiotelephone and one of a plurality of cell sites in a cellular-type radiotelephone communication system, comprising the steps of:
- providing a plurality of digital supervisory vectors, each vector representing identification of a unique single cell site;
- transmitting supervisory related signals, including said digital supervisory vectors, between the radiotelephone and one of the cell sites at a first subaudible digital bit rate;
- providing at least one synchronization word which has a maximum sync-cross distance and a minimum sync-cross distance for all said digital supervisory vectors; and
- transmitting data messages and said at least one synchronization word between the radiotelephone and said one of the cell sites at a second subaudible digital bit rate.

10. For use in a cellular communication system between a radiotelephone and one of a plurality of cell sites, a method for setting up a radiotelephone call between a radiotelephone and a cell site in response to a page from a cell site, comprising the steps of: (alert)
- providing a digital supervisory sequences to represent the identification of a cell site;
- transmitting said digital supervisory vector from said cell site at a first subaudible digital bit rate;
- identifying and verifying said transmitted digital supervisory sequence at the radiotelephone;
- transmitting said digital supervisory vector at least once from the radiotelephone;
- receiving and validating said transmitted digital supervisory vector from the radiotelephone at the cell site;
- transmitting at least one data message to the radiotelephone from the cell site at a second subaudible digital bit rate;
- in response to the reception of an alert data message from the cell site, indicating to the radiotelephone user that an alert message has been received and transmitting said digital supervisory vector inverted from the radiotelephone;
- in response to the reception of the digital supervisory vector inverted, transmitting the digital supervisory vector non-inverted from the cell site;
- in response to an off-hook condition at the radiotelephone, transmitting said digital supervisory vector non-inverted from the radiotelephone; and
- in response to the reception of said digital supervisory vector non-inverted from the radiotelephone, connecting the call to the radiotelephone.

11. For use in a cellular communication system between a radiotelephone and one of a plurality of cell sites, a method for handing-off a radiotelephone call from an originating cell site to a target cell site, comprising the steps of:
- transmitting a digital supervisory vector from the target cell site;
- terminating the transmission of the digital supervisory vector from the originating cell site and transmitting a hand-off data message from the originating cell site;
- at the radiotelephone, receiving digital supervisory vector from the target cell site;
- at the radiotelephone, transmitting the digital supervisory vector inverted to the target cell site to indicate that a hand-off has been successfully performed;
- receiving and validating the digital supervisory sequence inverted from the radiotelephone at the target cell site;
- at the originating cell site, terminating communication from the originating cell site to the radiotelephone; and
- transmitting the digital supervisory vector non-inverted from the radiotelephone to the target cell site while the call is continued at the target cell site.

12. For use in a cellular communication system between a radiotelephone and one of a plurality of cell sites, a method for releasing a radiotelephone call between a radiotelephone and a cell site, comprising the steps of: providing a first subaudible digital bit rate for the communication of supervisory related signals between the radiotelephone and the cell site;
- providing a second subaudible digital bit rate for communicating data messages between the radiotelephone and the cell site;
- from the radiotelephone, transmitting a disconnect data message at the second subaudible digital bit rate to the cell site;
- from the cell site, transmitting a query data message at the second subaudible digital bit rate to the radiotelephone and including therein a cell site code word that is unique to the cell site;
- in response to the reception of the query data message, transmitting a data message from the radiotelephone to the cell site containing said code word;
- in response to the failure to receive the query data message within a predetermined time interval, retransmitting the disconnect data message to the cell site;
- in response to the reception of a data message with a correct code word from the radiotelephone, disconnecting the call; and
- in response to the reception of a data message with an incorrect code word from the radiotelephone, maintaining the call.

13. The method according to claim 2 further comprising the steps of
- providing at least one digital synchronization sequence for synchronizing communication between the radiotelephone and one of the cell sites; and
- transmitting the digital synchronization sequence between the radiotelephone and the cell site at the first subaudible digital bit rate.

* * * * *

UNITED STATES PATENT AND TRADEMARK OFFICE
CERTIFICATE OF CORRECTION

PATENT NO. : 4,984,290

DATED : January 8, 1991

INVENTOR(S) : Stephen No. Levine Et Al.

It is certified that error appears in the above-identified patent and that said Letters Patent is hereby corrected as shown below:

In column 9, line 60, please delete "communicating" and replace with --communications--.

In column 10, line 5, please delete "cello" and replace with --cell--.

In column 10, line 67, please delete "for" and replace with --of--.

Signed and Sealed this

Ninth Day of June, 1992

Attest:

DOUGLAS B. COMER

Attesting Officer

Acting Commissioner of Patents and Trademarks